United States Patent
Lin et al.

(10) Patent No.: US 7,289,163 B2
(45) Date of Patent: Oct. 30, 2007

(54) METHOD AND APPARATUS FOR ADJUSTING COLOR EDGE CENTER IN COLOR TRANSIENT IMPROVEMENT

(75) Inventors: Peng Lin, Irvine, CA (US);
Yeong-Taeg Kim, Irvine, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 903 days.

(21) Appl. No.: 10/449,189

(22) Filed: Apr. 28, 2003

(65) Prior Publication Data

US 2003/0206245 A1 Nov. 6, 2003

(51) Int. Cl.
*H04N 5/21* (2006.01)
(52) U.S. Cl. ...................... 348/631; 348/630
(58) Field of Classification Search ............... 348/631, 348/630, 625, 607, 606, 624; 382/266; *H04N 5/21*
See application file for complete search history.

(56) References Cited

U.S. PATENT DOCUMENTS

| | | | |
|---|---|---|---|
| 4,935,806 A | 6/1990 | Rabii | 358/37 |
| 5,418,574 A | 5/1995 | Miyabata et al. | 348/625 |
| 5,920,357 A | 7/1999 | Ohara | 348/625 |
| 5,982,455 A * | 11/1999 | Steele et al. | 348/631 |
| 6,008,862 A * | 12/1999 | Bellers | 348/631 |

FOREIGN PATENT DOCUMENTS

JP    2001-169305    6/2001

\* cited by examiner

*Primary Examiner*—Sherrie Hsia
(74) *Attorney, Agent, or Firm*—Kenneth L. Sherman, Esq.; Michael Zarrabian, Esq.; Myers Dawes Andras & Sherman, LLP

(57) ABSTRACT

An improved method for color transient enhancement in an input video frame of pixels. The luminance value of a current pixel is compared to that of neighboring pixels. A correction value is determined and the chrominance value of the current pixel is "pushed" towards the neighboring pixel that has a luminance value closest to that of the current pixel, by adding the correction value to the current pixel's chrominance value. The original video frame is also separately processed using a CTI method, and the current pixel's corrected chrominance value is combined with the corresponding pixel in the output of the CTI processing by soft switching unit to generate an output video frame that is an enhanced version of the input video frame.

23 Claims, 8 Drawing Sheets

METHOD AND APPARATUS FOR ADJUSTING COLOR EDGE CENTER IN COLOR TRANSIENT IMPROVEMENT

FIELD OF THE INVENTION

The present invention relates generally to video signal processing, and more particularly to chrominance signal processing to enhance color transients.

BACKGROUND OF THE INVENTION

In color TV broadcasting standards, such as NTSC, PAL and SECAM, the transmitted signals include chrominance signals and luminance signals. In comparison to the luminance signal bandwidth, the chrominance signal bandwidth is rather narrow. The limited bandwidth of the chrominance signal produces relatively slow chrominance transitions, causing smeared color edges in the received/displayed images.

Different techniques have been used in attempts to enhance the sharpness of color transitions, such as those described in U.S. Pat. No. 4,935,806 and U.S. Pat. No. 5,920,357, known as "Color Transient Improvement(CTI)" techniques. The basic steps in the Color Transient Improvement techniques are to add a high-pass filtered signal, such as the second derivative of the original signal, to the original chrominance signals to restore the frequency components lost due to the limited bandwidth. This is followed by a post-processing to remove any undershoot and overshoot.

However, as shown in the example color transition plot in FIG. 1, the center of the color edge has a second derivative that equals zero, wherein the color transition near the center of the color edge is almost "flat". Therefore, the high-pass filter response near the center of the color edge is very weak. As a result, the region near the center of the color transition is left barely touched by conventional Color Transient Improvement methods.

There is, therefore, a need for a video enhancement method that sufficiently sharpens the slope of the color transient, and for an apparatus that properly processes the "flat" region near the center of the color transition to restore the frequency components lost due to the limited bandwidth.

BRIEF SUMMARY OF THE INVENTION

The present invention addresses the above needs. An object of the present invention is to provide a method to properly process the "flat" region near the center of the color transition to restore the frequency components lost due to the limited bandwidth. To achieve that goal, in one embodiment the present invention provides a method and apparatus to enhance color transients in input video signals including chrominance and luminance signals that represent video frames comprising pixels of video information. Initially, the first derivatives, including left and right derivatives, of both the input chrominance signal and luminance signal are computed. Based on the computed first derivatives of the chrominance and luminance signals, two correction signals are computed.

A logic control unit determines whether chrominance signal at the current pixel position requires correction. If the logic control unit determines to correct the chrominance signal, it chooses one of the computed correction signals based on the relationship between the left and right derivatives of the luminance signal. The correction signal is then added to the original chrominance signal.

As such, the chrominance signal correction procedure according to the present invention, "pushes" the chrominance value of the current pixel towards that of its left/right neighboring pixel, if the luminance value of the current pixel is closer to that of its left/right neighboring pixel.

Finally, the corrected chrominance signal can be combined with the output of a CTI processing unit using a soft switching unit. The soft switching is based on the second derivative of the original chrominance signal. As such, in another aspect, a enhancement system according to the present invention uses a CTI method if the second derivative of the input chrominance signal is large, but then smoothly switches to the "flat" transition center correction method described above, when the second derivative of the input chrominance signal is small.

Therefore, an enhancement method according to the present invention sufficiently sharpens the slope of the color transient and processes the "flat" region near the center of the color transition to restore the frequency components lost due to the limited bandwidth. Further, such a method can be used in conjunction with conventional methods, to process the video signal according to CTI methods when the second derivative of the input chrominance signal is large.

BRIEF DESCRIPTION OF THE DRAWINGS

These and other features, aspects and advantages of the present invention will become understood with reference to the following description, appended claims and accompanying figures where:

DETAILED DESCRIPTION OF THE INVENTION

Overview

In one embodiment, the present invention provides a method and apparatus to enhance color transients in input video signals including chrominance and luminance signals that represent video frames comprising pixels of video information.

Figure 1:
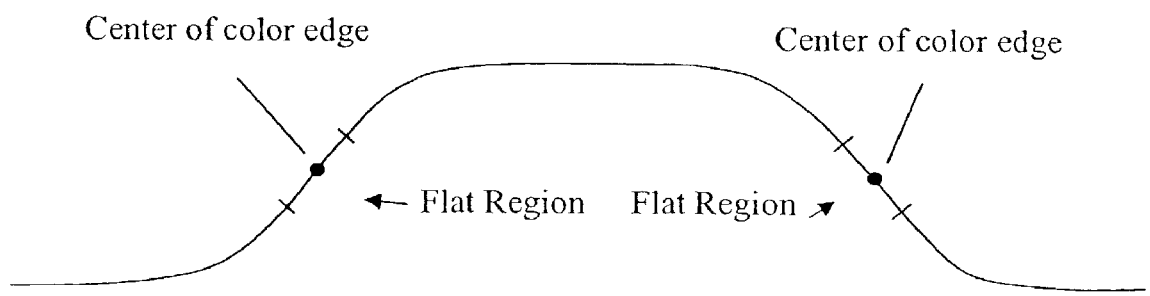
FIG. 1 is an example plot showing the "flat" region near the center of the color transition.
Figure 2:
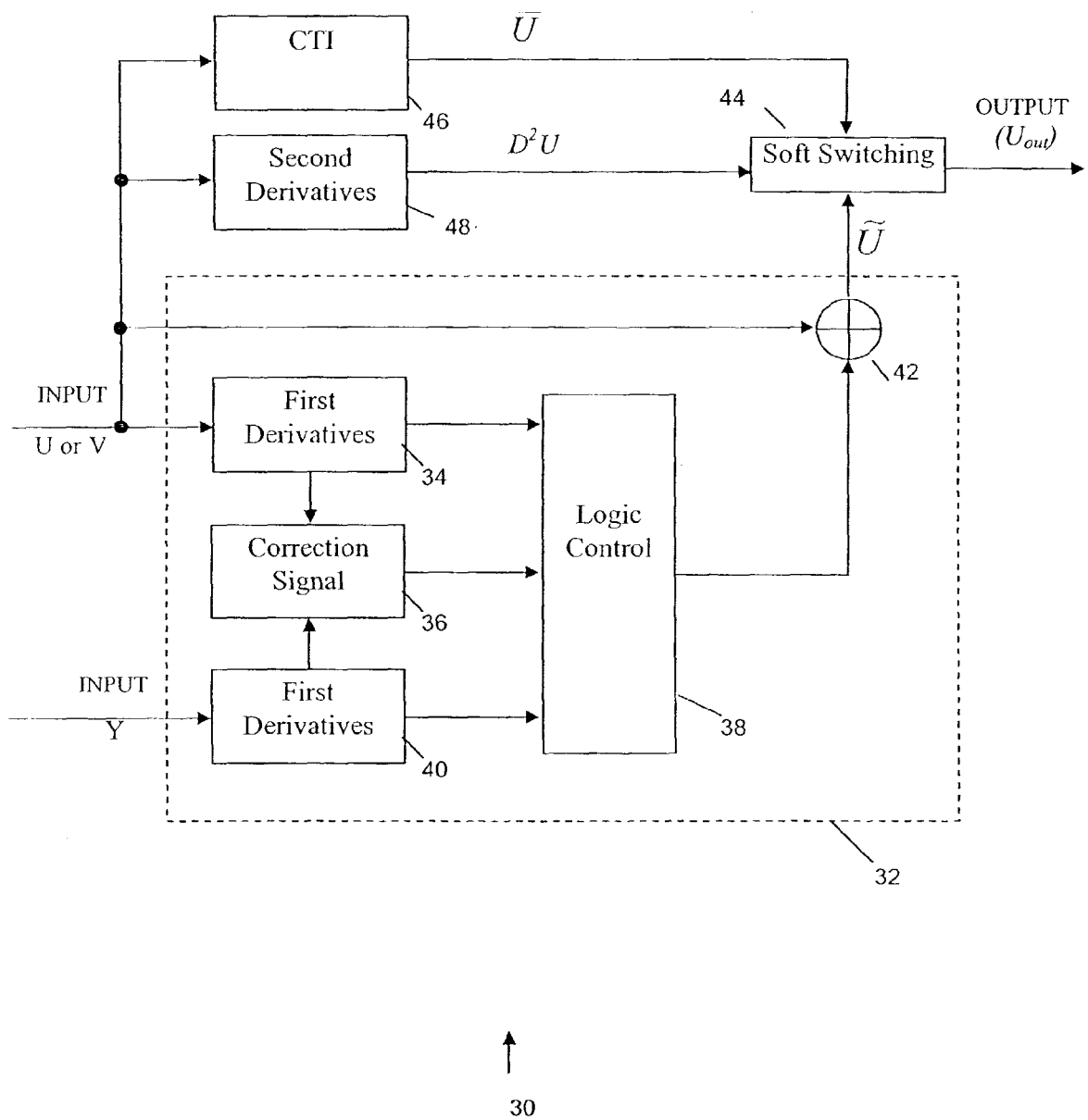
FIG. 2A shows a flowchart of the steps of an embodiment of a video processing method according to the present invention.
FIG. 2B is a block diagram of a the architecture of an embodiment of a video processing system according to the present invention.
Figure 2A:
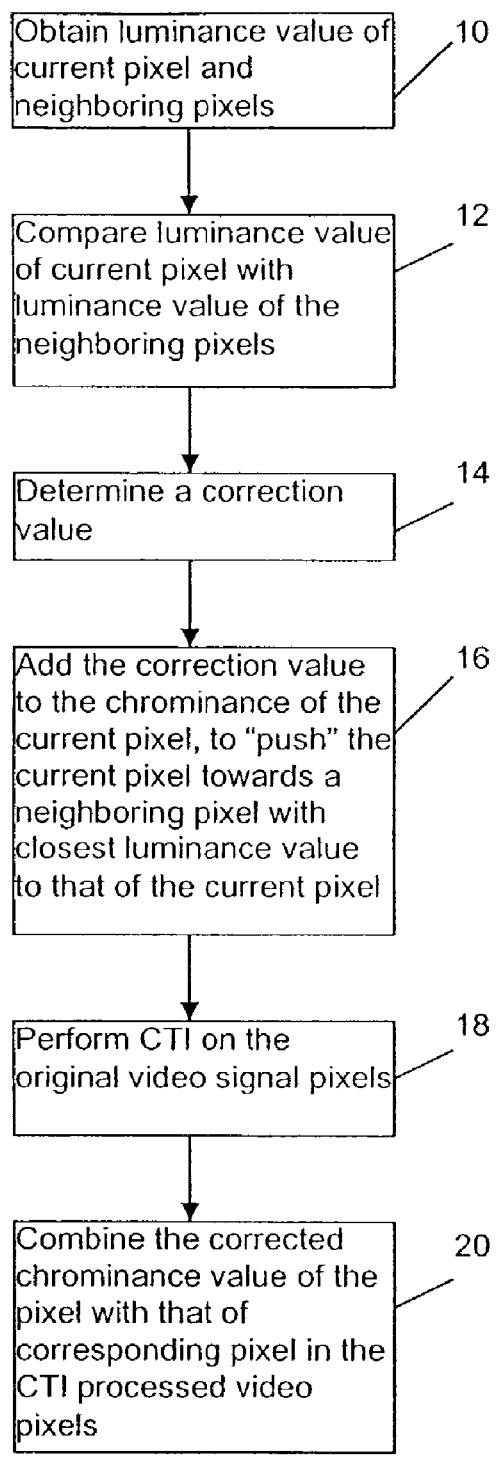

FIG. 2A shows a flowchart of the steps of embodiment of the enhancement method of the present invention. In processing a frame of M×N pixels, first the luminance value of the current pixel and neighboring pixels are obtained (step 10). Then the luminance value of the current pixel is compared to that of neighboring pixels. In one example, a determination is made if the luminance value of a current pixel is closer to that of its left (or upper) neighboring pixel or to that of its right (or lower) neighboring pixel (step 12). A correction value is determined (step 14) and the chrominance value of the current pixel is "pushed" towards the neighboring pixel that has a luminance value closest to that of the current pixel, by adding the correction value to the current pixel's chrominance value (step 16). The original video frame is also separately processed using a CTI method (step 18), and the current pixel's corrected chrominance value is combined with the corresponding pixel in the output of the CTI processing by soft switching unit to generate an output video frame that is an enhanced version of the input video frame (step 20).

In one example implementation, initially the first derivatives, including left and right derivatives, of both the input chrominance signal and luminance signal are computed. Based on the computed first derivatives of the chrominance and luminance signals, two correction signals are computed.

A logic control unit determines whether chrominance signal at the current pixel position requires correction. If the logic control unit determines to correct the chrominance signal, it chooses one of the computed correction signals based on the relationship between the left and right derivatives of the luminance signal. The correction signal is then added to the original chrominance signal.

As such, the chrominance signal correction procedure according to the present invention, "pushes" the chrominance value of the current pixel towards that of its left/right neighboring pixel, if the luminance value of the current pixel is closer to that of its left/right neighboring pixel.

Finally, the corrected chrominance signal can be combined with the output of a CTI processing unit using a soft switching unit. The soft switching is based on the second derivative of the original chrominance signal. As such, in another aspect, a enhancement system according to the present invention uses a CTI method if the second derivative of the input chrominance signal is large, but then smoothly switches to the "flat" transition center correction method described above, when the second derivative of the input chrominance signal is small.

Therefore, an enhancement method according to the present invention sufficiently sharpens the slope of the color transient and processes the "flat" region near the center of the color transition to restore the frequency components lost due to the limited bandwidth. Further, such a method can be used in conjunction with CTI methods, to process the video signal according to CTI methods when the second derivative of the input chrominance signal is large.

EXAMPLE IMPLEMENTATIONS

To help understanding, in the following, examples of the present invention are described using chrominance signalU. However as those skilled in the art recognize, the present invention is useful with chrominance signals U and V, and other characteristic signals. Further, to help understanding the examples below are described for horizontal processing (i.e., comparison of luminance value of a pixels with that of its left and right neighboring pixels). However as those skilled in the art recognize, vertical processing (i.e., comparison with upper and lower neighboring pixels) is similar to the horizontal processing, and is contemplated by the present invention.

Figure 2B:
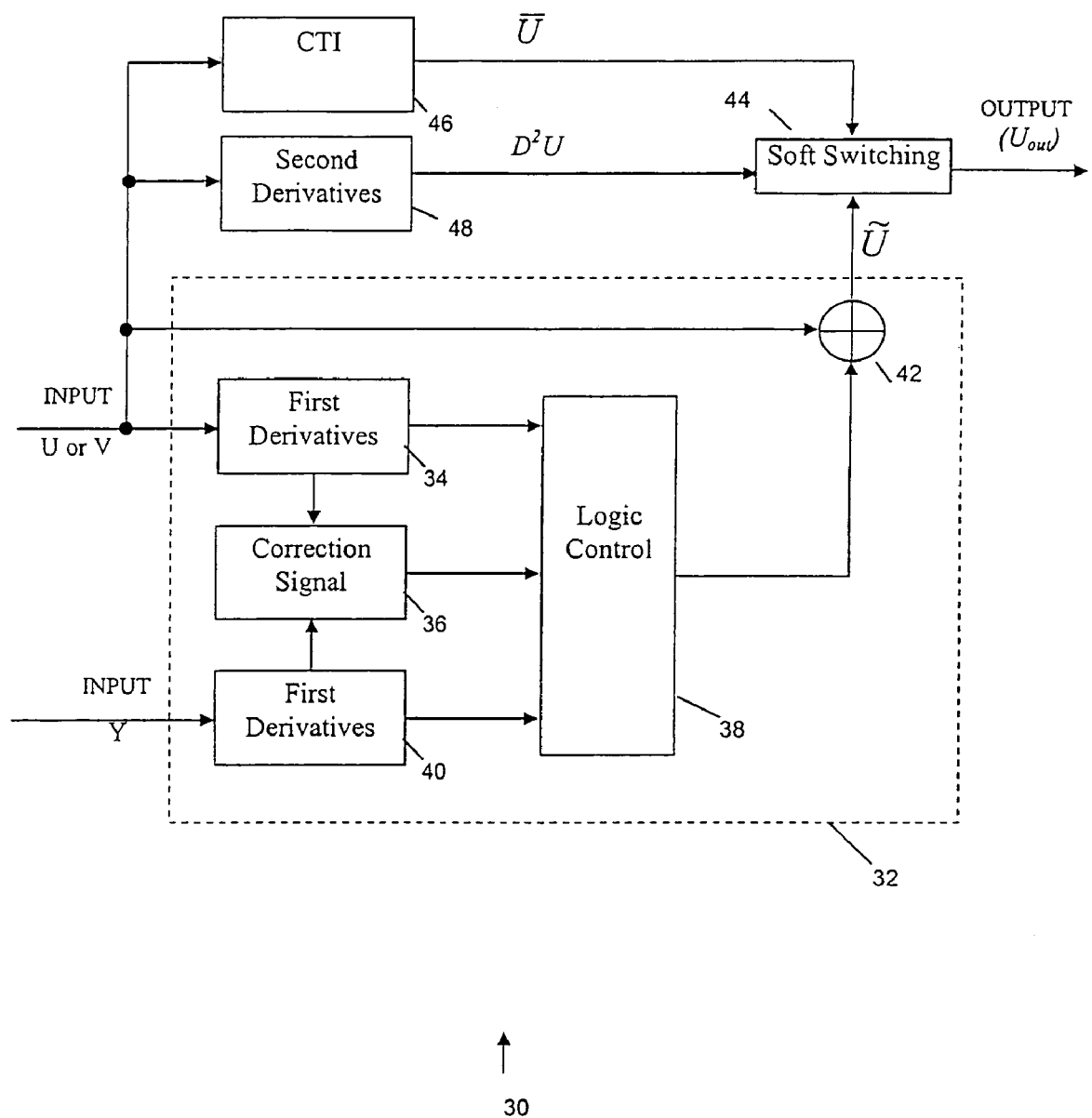

FIG. 2B shows a block diagram of a preferred embodiment of a video processing system 30 implementing the above enhancement method according to the present. In a chrominance correction section 32, the input chrominance signal is first supplied to a First Derivatives Calculator 34 for the chrominance signal U. The First Derivatives Calculator 34 calculates the following first derivatives:

$$dU_l(x)=U(x-1,y)-U(x,y), \quad (1)$$

$$dU_r(x)=U(x+1,y)-U(x,y), \quad (2)$$

$$dU(x)=min(|dU_l(x)|,|dU_r(x)|). \quad (3)$$

The indices l and r represent "left" and "right", respectively. The first derivatives $dU_l(x)$ and $dU_r(x)$ are supplied to a Correction Signal computing unit 36. The first derivative $dU(x)$ is also supplied to the Logic Control unit 38.

As shown in FIG. 2, another input signal, the luminance signal Y, is supplied to another First Derivatives Calculator 40 that calculates first derivatives of the luminance signal Y as:

$$dY_l(x)=Y(x-1,y)-Y(x,y), \quad (4)$$

$$dY_r(x)=Y(x+1,y)-Y(x,y), \quad (5)$$

$$dY(x)=||dY_r(x)|-|dY_l(x)||. \quad (6)$$

The first derivatives $dY_l(x)$ and $dY_r(x)$ are supplied to the Correction Signal computing unit 36, and the first derivatives $dY_l(x)$, $dY_r(x)$ and $dY(x)$ are supplied to the Logic Control unit 38.

The Correction Signal computing unit 36 uses the outputs of the two First Derivatives Calculators 34, 40 for the luminance and chrominance signals, respectively, to compute a correction signal. To do so, the Correction Signal computing unit 36 first computes the following gain control values:

$$g_l(x) = \begin{cases} 1, & \text{if } |dY_l(x)| < T_g; \\ T_g/|dY_l(x)|, & \text{otherwise.} \end{cases} \quad (7)$$

$$g_r(x) = \begin{cases} 1, & \text{if } |dY_r(x)| < T_g; \\ T_g/|dY_r(x)|, & \text{otherwise.} \end{cases} \quad (8)$$

wherein $T_g$ is an empirically determined threshold value.

Then the Control Signal computing unit 36 computes the correction signals by determining the products of the left and right gain control functions and the corresponding left and right first derivatives of the chrominance signal, respectively, i.e., $g_l(x)*dU_l(x)$ and $g_r(x)*dU_r(x)$.

The correction signals are supplied to the Logic Control unit 38, wherein the Logic Control unit 38 determines which correction signal to use to correct the original input chrominance signal. That determination is made based on the values of the luminance signal of the pixels near a current pixel, as described by examples below.

In the example implementation herein, if the luminance value of the current pixel is closer to that of its left neighboring pixel, then the chrominance value of the current pixel is "pushed" towards that of its left neighboring pixel. And, if the luminance value of the current pixel is closer to that of its right neighboring pixel, then the chrominance value of the current pixel is pushed towards that of its right neighboring pixel.

Figure 3:
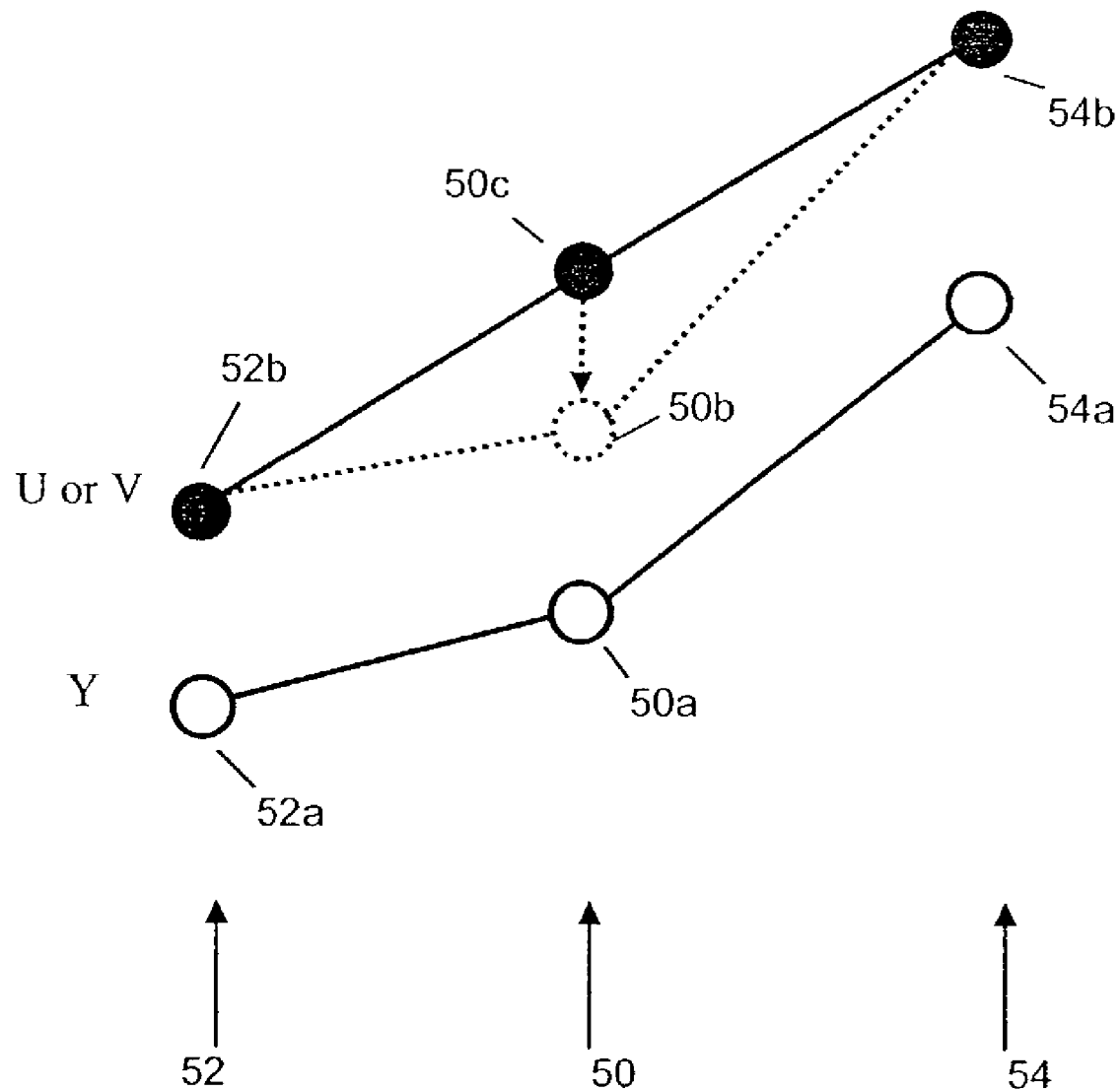
FIG. 3 is a diagram illustrating an example of modifying the chrominance value of a current pixel according to the present invention, by "pushing" the pixel down closer to that of its left neighboring pixel based on the luminance values of pixels near the current pixel.

FIG. 3 shows an example wherein for a current pixel 50, the luminance value Y (hollow circle) 50a is closer to the luminance value 52a of its left neighboring pixel 52, than the luminance value 54a of the right neighboring pixel 54. In this case, the chrominance value U (solid circle) 50b of the current pixel 50 is pushed down to make it closer to the chrominance value 52b of its left neighboring pixel 52 by adding the left correction signal, e.g. $g_l(x)*dU_l(x)$. For the example of FIG. 3, the left correction signal $g_l(x)*dU_l(x)$ is negative. Therefore the chrominance value 50b for the current pixel 50 is "pushed down" to value 50c (as symbolically shown by the dashed arrow) after adding the left correction signal $g_l(x)*dU_l(x)$ The corrected luminance 50c for the current pixel 50 is shown by a hollow-dashed circle in FIG. 3.

Figure 4:
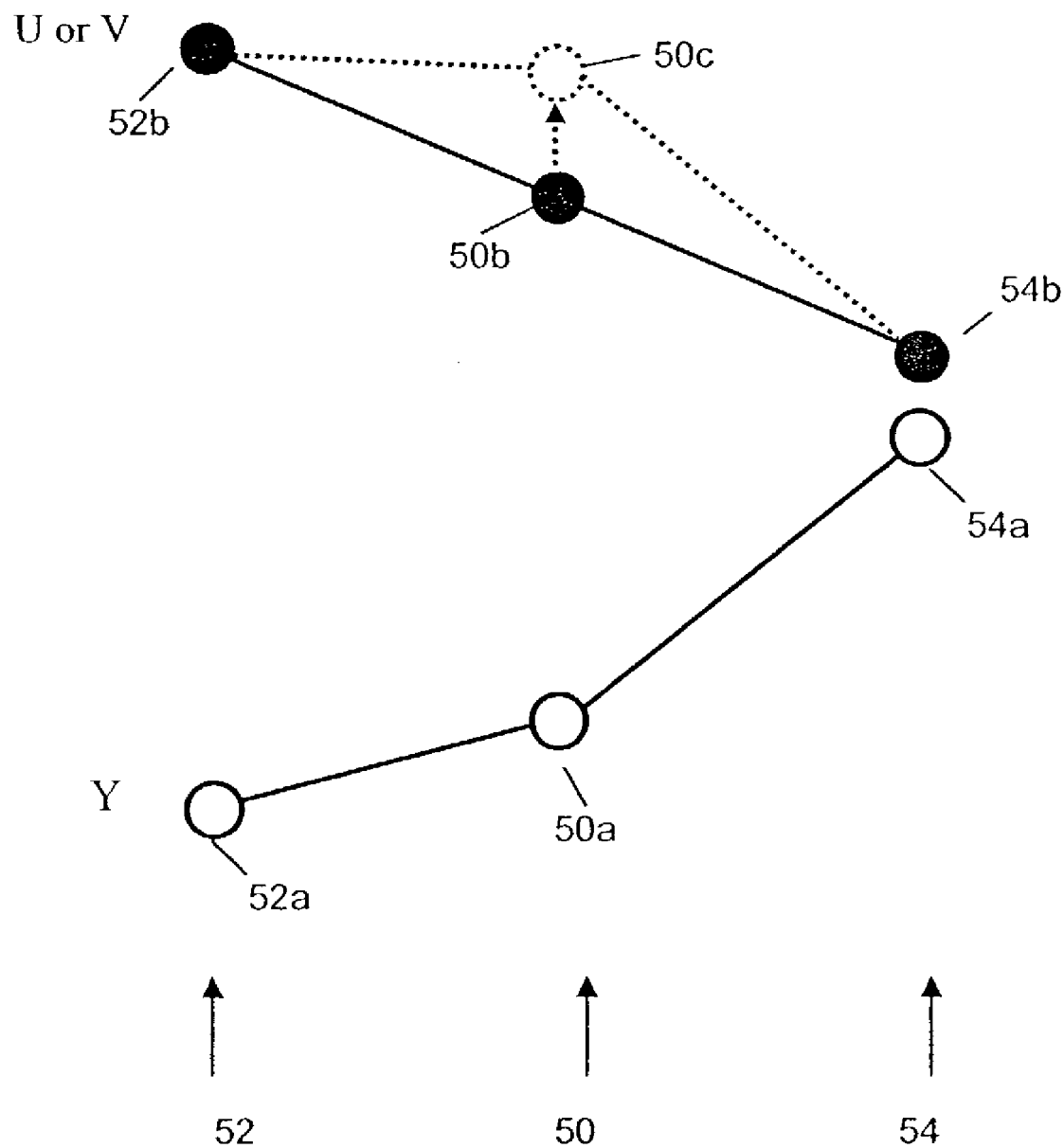
FIG. 4 is a diagram illustrating another example of modifying the chrominance value of a current pixel according to the present invention, by "pushing" the pixel up to make it closer to that of its left neighboring pixel based on the luminance values of pixels near the current pixel.

Similarly, FIG. 4 shows an example wherein the luminance value Y (hollow circle) 50a of the current pixel 50 is closer to that of its left neighboring pixel 52 than that of the right neighboring pixel 54. As such, the chrominance value U (solid circle) 50b of the current pixel 50 is pushed towards that of it left neighboring pixel 52 by adding the left correction signal, e.g. $g_l(x)*dU_l(x)$ to it. In this case, $g_l(x)*dU_l(x)$ is positive, whereby the chrominance signal U (solid circle) of the current pixel 50 is pushed up as shown by the corrected luminance value 50c.

Figure 5:
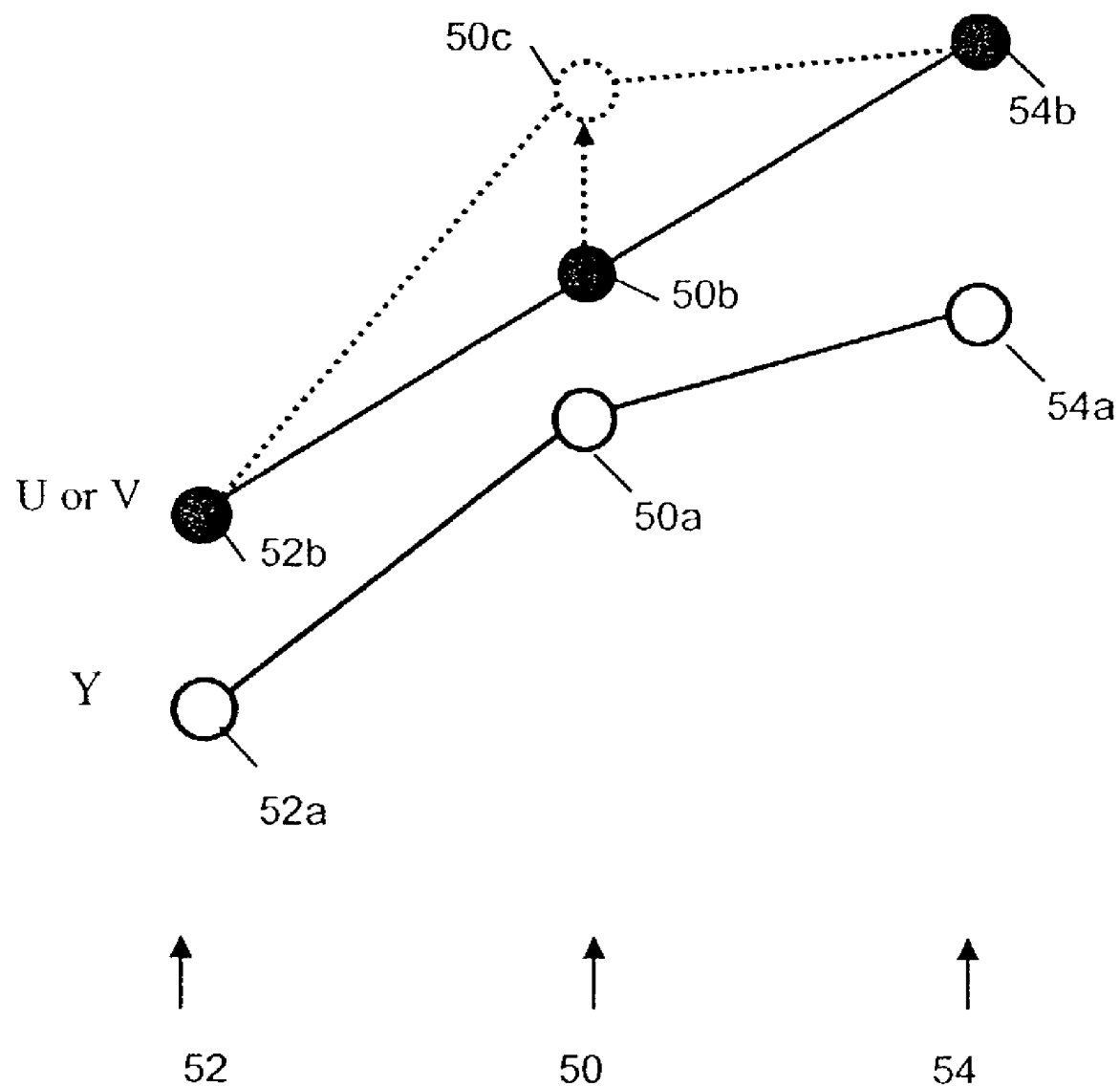
FIG. 5 is a diagram illustrating another example of modifying the chrominance value of a current pixel according to the present invention, by "pushing" the pixel up closer to that of its right neighboring pixel based on the luminance values of pixels near the current pixel.
Figure 6:
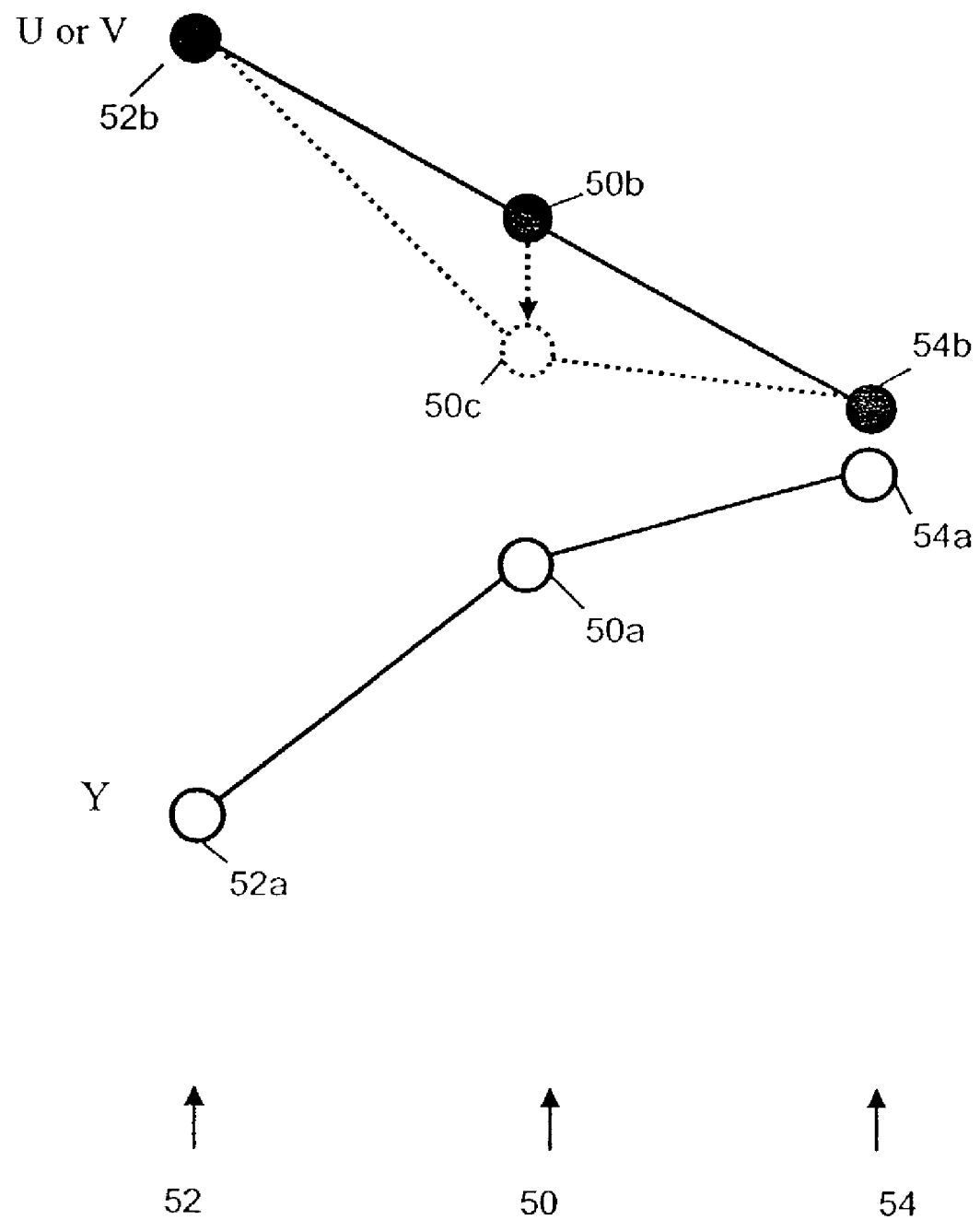
FIG. 6 is a diagram illustrating another example of modifying the chrominance value of a current pixel according to the present invention, by "pushing" the pixel down closer to that of its right neighboring pixel based on the luminance values of pixels near the current pixel.

Similarly, FIG. 5 and FIG. 6 each show another example wherein the chrominance value U, 50b of the current pixel 50 is pushed towards that of its right neighboring pixel 54 because the luminance value Y, 50a of the current pixel 50 is closer to that of its right neighboring pixel 54, than that of the left neighboring pixel 52. To push the chrominance value U 50b of the current pixel 50 towards that of its right neighboring pixel 54, the right correction signal, e.g. $g_r(x)*dU_r(x)$, is selected to be add to the chrominance value U, 50b to generate the corrected chrominance value 50c.

Referring back to FIG. 2B, generally, the output of the example Logic Control unit 38 can be summarized as the pseudo-code:

if (dU(x)>$T_u$ and dY(x)>$T_y$) then (9)
{ if (|$dY_l(x)$|<|$dY_r(x)$|) then
    return $g_l(x)*dU_l(x)$,
  if (|$dY_l(x)$|>|$dY_r(x)$|) then
    return $g_r(x)*dU_r(x)$,
}
else
    return 0;

wherein $T_u$ and $T_y$ are empirically determined threshold values.

The condition dU(x)>$T_u$ in the first "if" statement in the pseudo-code above is to check whether the difference of the chrominance signal U at the current pixel relative to that neighboring pixels is significant. If the difference is not significant, then the chrominance signal U does not need to be corrected ("pushed") at the current pixel. If the difference is significant, then the condition dY(x)>$T_y$ is checked, to determine whether the luminance value Y at the current pixel is biased to the value of any of its two neighboring pixels. If dY(x) is small, the luminance value Y at the current pixel is not biased to the value of any of its two neighboring pixels. This case indicates a gradual color change, thus no correction is required. Therefore, only when dU(x)>$T_u$ and dY(x)>$T_y$, does the chrominance value U at the current pixel require correction.

In the example of FIG. 2B, the output of the Logic Control unit 38 (i.e., correction signal) and the input original chrominance signal U are supplied to a Summer junction 42, wherein the Summer junction 42 adds the correction signal to the original chrominance signal U for a current pixel. Thereby, each pixel of a frame of pixels representing a video image is so processed.

The output, $\tilde{U}$, of the Summer junction 42 depends on the correction signal/value selected by the Logic Control unit 38, and can be expressed according to the pseudo-code:

if (dU(x)>$T_u$ and dY(x)>$T_y$) then (10)
{ if (|$dY_l(x)$|<|$dY_r(x)$|) then
    $\tilde{U}(x) = U(x) + g_l(x)*dU_l(x)$,
  if (|$dY_l(x)$|>|$dY_r(x)$|) then
    $\tilde{U}(x) = U(x) + g_r(x)*dU_r(x)$,
}
else
    $\tilde{U}(x) = U(x)$.

In accordance with an additional aspect of the present invention, the input chrominance signal is separately supplied to the CTI unit 46 that implements a color transient improvement algorithm. The output of the CTI unit, denoted as $\overline{U}$, is supplied to a Soft Switching unit 44. The output $\tilde{U}$ of the Summer junction 42 is also supplied to the Soft Switching unit 44, where it is combined with the output of a CTI unit 46. The input chrominance signal is also supplied to a Second Derivative calculator 48 to calculate the second derivative $D^2U$. In one example, the second derivative is approximated by a band-pass filter with the filter coefficients (1, −2, 1). The output of the Second Derivative calculator 48 is also supplied to the Soft Switching unit 44.

At the Soft Switching unit 44, the output of the CTI unit 46, $\overline{U}$, is combined with the corrected signal $\tilde{U}$. As noted above, because the center of the color edge has a second derivative that equals zero, the color transition near the center of the color edge is almost "flat". Therefore, the region near the center of the color transition is not enhanced by the high-pass filtering based conventional color transient improvement methods. As such, the Soft Switching unit 44 switches to the corrected signal $\tilde{U}$ as the output $U_{out}$ in FIG. 2.

In one example, such soft switching is realized as:

$$U_{out}(x)=(1-\alpha(x))*\overline{U}(x)+\alpha(x)*\tilde{U}(x) \quad (11)$$

wherein $U_{out}$ is the output of the video processing system of FIG. 2B, and α(x) is the soft switching function which is defined as following:

$$\alpha(x)=1 \text{ if } |D^2U(x)|<T_1; \quad (12)$$

$$\alpha(x)=0 \text{ if } |D^2U(x)|>T_2; \quad (13)$$

$$\alpha(x)=(T_2-|D^2U(x)|)/(T_2-T_1) \text{ if } T_1 \leq |D^2U(x)| \leq T_2; \quad (14)$$

where $T_1$ and $T_2$ are empirically determined threshold values.

From the expression (11) for $U_{out}(x)$ and the definitions (12) through (14) for α(x), it can be seen that in the "non-flat" region (i.e., |$D^2U(x)$|>$T_2$) the output $U_{out}(x)$= $\overline{U}(x)$. It can further be seen that in the "flat" region (i.e., $|D^2U(x)|<T_1$) the output $U_{out}(x)=\tilde{U}(x)$. In other regions $U_{out}(x)$ is a function that is smoothly varying from $\overline{U}$ to $\tilde{U}$.

The above example enhancement method and apparatus have been described in relation to a two-dimensional frame of pixels situated in rows and columns. Though the enhancement process above has been described in relation to pixels in columns that are to the right/left of a current pixel, the above process is equally applicable to other pixels neighboring the current pixel, including pixels in rows above an below a current pixel in the frame.

As such, the luminance value of the current pixel is compared to that of neighboring pixels (e.g., right, left, above, below, etc.), to identify a neighboring pixel with a luminance value closest to the luminance value of the current pixel. A correction value is then calculated, and added to chrominance value of the current pixel to generate a corrected chrominance value that is close to the chrominance value of the identified neighboring pixel. The original video frame is also processed using a CTI method, wherein the corrected chrominance value of the current pixel is combined with the corresponding pixel in the output of the CTI processing by soft switching, to generate an output video frame that is an enhanced version of the input video frame.

Further, the aforementioned apparatus/systems in FIG. 2, according to the present invention, can be implemented as program instructions for execution by a processor, as logic circuits, as ASIC, as firmware, etc., as is known to those skilled in the art. Therefore, the present invention is not limited to the example embodiments described herein.

The present invention has been described in considerable detail with reference to certain preferred versions thereof; however, other versions are possible. Therefore, the spirit and scope of the appended claims should not be limited to the description of the preferred versions contained herein.

What is claimed is:

1. A method of processing an input frame of pixels representing a video signal having a transient response, each pixel having a luminance value and a chrominance value, comprising the steps of:
   enhancing color transition by adjusting the chrominance value of a color edge center based on the luminance values of neighboring pixels to provide enhanced pixels.

2. The method of claim 1, wherein adjusting the chrominance value of a selected pixel further includes the steps of:
   comparing the luminance value of the selected pixel with luminance values of the neighboring pixels, to identify a pixel among the neighboring pixels with a luminance value closest to the luminance value of the selected pixel; and
   modifying the chrominance value of the selected pixel to bring the chrominance value of the selected pixel closer to the chrominance value of the identified neighboring pixel.

3. The method of claim 2, wherein modifying the chrominance value of the selected pixel to bring the chrominance value of the selected pixel closer to the chrominance value of the identified neighboring pixel further includes the steps of:
   determining a correction value based on the chrominance and luminance values of the identified pixel; and
   adding the correction value to the chrominance value of the selected pixel, to generate a corrected chrominance value for the selected pixel.

4. The method of claim 3, wherein:
   each chrominance value has a U component and a V component,
   each correction value has a U component and a V component, and
   adding the correction value to the chrominance value of the selected pixel further includes the steps of adding the correction value components to the respective chrominance value components of the selected pixel.

5. The method of claim 4, wherein:
   the U component of the correction value is $g_i(x)*dU_i(x)$, and
   the V component of the correction value is $g_i(x)*dV_1(x)$, wherein:
      i denotes the identified neighboring pixel in the frame,
      $g_i(x)$ is a gain control function based on a difference in between the luminance value of the selected pixel x and the luminance value of the identified pixel,
      $dU_i(x)$ represents a difference between the U component of the chrominance value of the selected pixel x and the U component of the chrominance value of the identified pixel, and
      $dV_i(x)$ represents a difference between the V component of the chrominance value of the selected pixel x and the V component of the chrominance value of the identified pixel.

6. The method of claim 2, wherein:
   the frame comprises an array of pixels arranged as rows and columns, and
   adjusting the chrominance value of the selected pixel further includes the steps of:
      comparing the luminance value of the selected pixel with luminance values of the neighboring pixels in columns to the right and left and the selected pixel, to identify a pixel among those neighboring pixels with a luminance value closest to the luminance value of the selected pixel; and
      modifying the chrominance value of the selected pixel to bring the chrominance value of the selected pixel closer to the chrominance value of the identified neighboring pixel.

7. The method of claim 2, wherein:
   the frame comprises an array of pixels arranged as rows and columns, and
   adjusting the chrominance value of the selected pixel further includes the steps of:
      comparing the luminance value of the selected pixel with luminance values of the neighboring pixels in rows above and below the selected pixel, to identify a pixel among those neighboring pixels with a luminance value closest to the luminance value of the selected pixel; and
      modifying the chrominance value of the selected pixel to bring the chrominance value of the selected pixel closer to the chrominance value of the identified neighboring pixel.

8. The method of claim 2, wherein modifying the chrominance value of the selected pixel further includes the steps of:
   comparing a difference between the luminance value of the selected pixel and the luminance value of the identified pixel with a threshold value; and
   if the difference exceeds the threshold value, then modifying the chrominance value of the selected pixel to bring the chrominance value of the selected pixel closer the chrominance value of the identified neighboring pixel.

9. The method of claim 2, wherein modifying the chrominance value of the selected pixel further includes the steps of:

comparing a difference between the chrominance value of the selected pixel and the chrominance value of the identified pixel with a threshold value; and if the difference exceeds the threshold value, then modifying the chrominance value of the selected pixel to bring the chrominance value of the selected pixel closer the chrominance value of the identified neighboring pixel.

10. The method of claim 2, wherein modifying the chrominance value of the selected pixel further includes the steps of:

comparing a first difference between the chrominance value of the selected pixel and the chrominance value of the identified pixel with a first threshold value;

comparing a second difference between the luminance value of the selected pixel and the luminance value of the identified pixel with a second threshold value; and if the first difference exceeds the first threshold value, and if the second difference exceeds the second threshold value, then modifying the chrominance value of the selected pixel to bring the chrominance value of the selected pixel closer to the chrominance value of the identified neighboring pixel.

11. The method of claim 1, further comprising the steps of:

performing color transition improvement (CTI) on the input pixels to provide pixels with improved color transitions; and combining the values of said enhanced pixels and the pixels with improved color transitions, to generate an improved and enhanced frame of pixels.

12. The method of claim 11, wherein combining the values further includes the steps of:

determining whether the color transition near the center of the color edge is below a predetermined value; and if so, then providing the CTI results as the enhanced output; otherwise, providing the enhanced pixels as the enhanced output.

13. The method of claim 11, wherein combining the values further includes the steps of:

determining a second derivative of the color edge transition; and if the second derivative is essentially non-zero, then providing the CTI results as the enhanced output; otherwise, providing the enhanced pixels as the enhanced output.

14. An apparatus for processing an input frame of pixels representing a video signal having a transient response, each pixel having a luminance value and a chrominance value, comprising:

a correction value generator for generating a correction value for adjusting a selected pixel's color edge center based on luminance values of neighboring pixels; and a combiner for adding the correction value to the chrominance value of the selected pixel to provide enhanced pixels.

15. The apparatus of claim 14, wherein:

the correction value generator further comprises a control unit that compares the luminance value of the selected pixel with luminance values of the neighboring pixels, to identify a pixel among the neighboring pixels with a luminance value closest to the luminance value of the selected pixel, and determines the correction value based on the luminance value of the identified pixel, and the combiner modifies the chrominance value of the selected pixel by adding the correction value to the chrominance value of the selected pixel to bring the chrominance value of the selected pixel closer the chrominance value of the identified neighboring pixel.

16. The apparatus of claim 15, wherein:

each chrominance value has a U component and a V component, each correction value has a U component and a V component, and the combiner adds the correction value components to the respective chrominance value components of the selected pixel.

17. The apparatus of claim 16, wherein the control unit generates the U component of the correction value as $g_i(x)*dU_i(x)$, and generates the V component of the correction value as $g_i(x)*dV_i(x)$, wherein i denotes the identified neighboring pixel in the frame, $g_i(x)$ is a gain control function based on a difference between the luminance value of the selected pixel x and the luminance value of the identified pixel, $dU_i(x)$ represents a difference between the U component of the chrominance value of the selected pixel x and the U component of the chrominance value of the identified pixel, and $dV_i(x)$ represents a difference between the V component of the chrominance value of the selected pixel x and the V component of the chrominance value of the identified pixel.

18. The apparatus of claim 15, wherein the control unit is further configured to compare a difference between the luminance value of the selected pixel and the luminance value of the identified pixel with a threshold value, and if the difference exceeds the threshold value, then generates said correction value.

19. The apparatus of claim 15, wherein the control unit is further configured to compare a difference between the chrominance value of the selected pixel and the chrominance value of the identified pixel with a threshold value, and if the difference exceeds the threshold value, then generate the correction value.

20. The apparatus of claim 15, wherein the control unit is further configured to (i) compare a first difference between the chrominance value of the selected pixel and the chrominance value of the identified pixel with a first threshold value, (ii) compare a second difference between the luminance value of the selected pixel and the luminance value of the identified pixel with a second threshold value, and (iii) if the first difference exceeds the first threshold value, and if the second difference exceeds the second threshold value, then generate the correction value.

21. The apparatus of claim 14, further comprising:

a color transition improvement (CTI) unit that processes the input pixels to provide pixels with improved color transitions; and a switch that combines the values of said enhanced pixels and the pixels with improved color transitions, to generate an improved and enhanced frame of pixels.

22. The apparatus of claim 21, wherein:

the switch is further configured to determine whether the color transition near the center of the color edge is below a predetermined value, and if so, then provides the CTI results as the enhanced output; otherwise, provides the enhanced pixels as the enhanced output.

23. The apparatus of claim 21, further comprising a differentiator that determines a second derivative of the color edge transition, and the switch is further configured to determine whether the second derivative is essentially non-zero, and if so, provides the CTI results as the enhanced output; otherwise, provides the enhanced pixels as the enhanced output.

* * * * *